(12) United States Patent
Ehrman (10) Patent No.: US 9,818,151 B2
(45) Date of Patent: Nov. 14, 2017

(54) REMOTE VEHICLE RENTAL SYSTEMS AND METHODS

(71) Applicant: I.D. Systems, Inc., Woodcliff Lake, NJ (US)

(72) Inventor: Michael L. Ehrman, New York, NY (US)

(73) Assignee: I.D. Systems, Inc., Woodcliff Lake, NJ (US)

(*) Notice: Subject to any disclaimer, the term of this patent is extended or adjusted under 35 U.S.C. 154(b) by 20 days.

(21) Appl. No.: 13/693,696

(22) Filed: Dec. 4, 2012

(65) Prior Publication Data

US 2014/0156111 A1   Jun. 5, 2014

(51) Int. Cl.
| | |
|---|---|
| *G06Q 10/02* | (2012.01) |
| *G06Q 30/06* | (2012.01) |
| *G07B 15/00* | (2011.01) |
| *H04L 29/06* | (2006.01) |
| *H04W 4/00* | (2009.01) |

(Continued)

(52) U.S. Cl.
CPC ......... *G06Q 30/0645* (2013.01); *G07B 15/00* (2013.01); *H04L 63/08* (2013.01); *H04L 67/12* (2013.01); *H04M 1/72522* (2013.01); *H04M 2250/10* (2013.01); *H04W 4/008* (2013.01); *H04W 4/046* (2013.01)

(58) Field of Classification Search
None
See application file for complete search history.

(56) References Cited

U.S. PATENT DOCUMENTS

| | | |
|---|---|---|
| 5,420,405 A | 5/1995 | Chasek |
| 5,838,251 A | 11/1998 | Brinkmeyer et al. |

(Continued)

FOREIGN PATENT DOCUMENTS

| | | |
|---|---|---|
| WO | WO 2007095545 A2 * | 8/2007 |
| WO | 2008/124795 A1 | 10/2008 |
| WO | 2009/073806 A2 | 6/2009 |

OTHER PUBLICATIONS

The International Search Report and Written Opinion in the related PCT Application dated Apr. 18, 2014.

(Continued)

*Primary Examiner* — Jean-Paul Cass
(74) *Attorney, Agent, or Firm* — Troutman Sanders LLP; James E. Schutz; Andrew C. Doherty (57) ABSTRACT

A system for renting vehicles is disclosed. The system can comprise a vehicle access communicator ("VAC") capable of interfacing with one or more functions of a rental vehicle and a user provided portable electronic device. The VAC can control various functions of the vehicle including, but not limited to, the door locks and/or enabling/disabling the vehicle. The VAC can also monitor various functions of the vehicle including, but not limited to, the fuel level and/or the odometer readings. The VAC can connect to the portable electronic device using a suitable connection method to access additional functionality such as, for example and not limitation, locations services, cellular, and/or internet access. The VAC and the portable electronic device can be used to provide a rental system with reduced infrastructure and operating costs. The system can enable the use of "Green Zones" to provide permanent or temporary vehicle rental areas.

14 Claims, 6 Drawing Sheets

(51) Int. Cl.
  *H04W 4/04* (2009.01)
  *H04L 29/08* (2006.01)
  *H04M 1/725* (2006.01)

(56) References Cited

U.S. PATENT DOCUMENTS

| | | | |
|---|---|---|---|
| 5,864,297 A | 1/1999 | Sollestre et al. | |
| 5,896,554 A | 4/1999 | Itoh | |
| 6,264,103 B1* | 7/2001 | Stanley | G06Q 20/363 235/380 |
| 6,898,493 B2 | 5/2005 | Ehrman et al. | |
| 7,079,015 B2 | 7/2006 | Gibeau | |
| 7,356,389 B2* | 4/2008 | Holst | G06F 8/61 244/1 R |
| 7,366,677 B1* | 4/2008 | Liu | B60R 25/00 340/5.25 |
| 7,912,625 B2* | 3/2011 | Cahoon | B60R 25/045 307/10.1 |
| 7,936,736 B2* | 5/2011 | Proctor, Jr. | G06Q 30/0623 370/338 |
| 7,978,128 B2* | 7/2011 | Scherzinger | G01C 15/00 342/357.23 |
| 8,000,892 B2* | 8/2011 | Banerjee | G01C 21/20 340/988 |
| 8,090,359 B2* | 1/2012 | Proctor, Jr. | G06Q 30/0623 455/414.3 |
| 8,090,616 B2* | 1/2012 | Proctor, Jr. | G06Q 30/0623 370/329 |
| 8,116,749 B2* | 2/2012 | Proctor, Jr. | G06Q 30/0623 455/411 |
| 8,156,427 B2* | 4/2012 | Graham | G06F 17/30011 715/254 |
| 8,285,570 B2* | 10/2012 | Meyer | G06Q 10/02 705/5 |
| 8,369,842 B2* | 2/2013 | Proctor, Jr. | G06Q 30/0623 455/414.3 |
| 8,370,955 B2* | 2/2013 | Proctor, Jr. | G06Q 30/0623 705/1.1 |
| 8,374,592 B2* | 2/2013 | Proctor, Jr. | G06Q 30/0623 455/414.3 |
| 2002/0186144 A1 | 12/2002 | Meunier | |
| 2003/0033175 A1* | 2/2003 | Ogura | G06Q 10/02 705/5 |
| 2005/0033503 A1 | 2/2005 | Yamamoto | |
| 2005/0096809 A1 | 5/2005 | Skeen et al. | |
| 2005/0190080 A1 | 9/2005 | Flick | |
| 2006/0143463 A1* | 6/2006 | Ikeda | B60R 25/04 713/182 |
| 2006/0173587 A1 | 8/2006 | Oesterling et al. | |
| 2007/0174081 A1* | 7/2007 | Smith | G06Q 30/0645 705/307 |
| 2007/0200663 A1 | 8/2007 | White et al. | |
| 2007/0224938 A1* | 9/2007 | Jung | H04B 5/0062 455/41.2 |
| 2007/0224939 A1* | 9/2007 | Jung | H04B 5/0062 455/41.2 |
| 2008/0062958 A1* | 3/2008 | Jonsson | H04L 41/00 370/350 |
| 2008/0079551 A1 | 4/2008 | Blanchet et al. | |
| 2008/0091309 A1 | 4/2008 | Walker | |
| 2008/0114501 A1* | 5/2008 | Wu | B60R 25/045 701/2 |
| 2008/0200209 A1* | 8/2008 | Cahoon | B60R 25/045 455/557 |
| 2008/0228365 A1 | 9/2008 | White et al. | |
| 2009/0066488 A1* | 3/2009 | Qiahe | B60R 25/102 340/426.1 |
| 2010/0127825 A1 | 5/2010 | Drummond et al. | |
| 2010/0217630 A1 | 8/2010 | Ehrman et al. | |
| 2011/0025459 A1* | 2/2011 | Denison | G06Q 20/18 340/5.51 |
| 2011/0050390 A1* | 3/2011 | Denison | B60R 25/102 340/5.51 |
| 2011/0050391 A1* | 3/2011 | Denison | G07C 9/00571 340/5.51 |
| 2011/0060480 A1* | 3/2011 | Mottla | G06Q 10/02 701/2 |
| 2011/0082882 A1* | 4/2011 | Denison | G07C 9/00571 707/770 |
| 2011/0087370 A1* | 4/2011 | Denison | G07C 9/00571 700/236 |
| 2011/0187496 A1* | 8/2011 | Denison | G07C 9/00571 340/5.53 |
| 2011/0231318 A1* | 9/2011 | Finley | G06Q 20/18 705/64 |
| 2011/0276609 A1* | 11/2011 | Denison | G07F 11/002 707/812 |
| 2011/0289123 A1* | 11/2011 | Denison | G07F 11/002 707/812 |
| 2011/0289124 A1* | 11/2011 | Denison | G07F 11/002 707/812 |
| 2012/0242830 A1* | 9/2012 | Kumagai | G01C 15/004 348/135 |
| 2013/0294306 A1* | 11/2013 | Borges | H04W 76/02 370/311 |
| 2013/0317693 A1 | 11/2013 | Jefferies et al. | |
| 2014/0121890 A1 | 5/2014 | Gercekci | |
| 2014/0263629 A1* | 9/2014 | McQuade | G07F 7/12 235/381 |
| 2014/0368373 A1* | 12/2014 | Crain | G01S 5/02 342/5 |
| 2015/0105941 A1* | 4/2015 | Pandya | G07C 5/008 701/2 |

OTHER PUBLICATIONS

Volt, "2013 Volt," 2012 General Motors, Nov. 2012, pp. 1-23; http://web.archive.org/web/20121119082512/http://www.chevrolet.com/content/dam/Chevrolet/northamerica/usa/ncswebsite/en/Home/Help%20Center/Download%20a%20Brochure/02_PDFs/MY13%20Volt%20eBrochure%20-%20Final%20Approved.pdf.
Extended European Search Report for related European Patent Application No. 13860999.5 dated Jun. 8, 2016.
International Search Report and Written Opinion for International Patent Application No. PCT/US2013/073042 dated Apr. 18, 2014.
International Preliminary Report on Patentability for International Patent Application No. PCT/US2013/073042 dated Jun. 9, 2015.

* cited by examiner

REMOTE VEHICLE RENTAL SYSTEMS AND METHODS

BACKGROUND

1. Technical Field

Embodiments of the present invention relate generally to providing remote access to rental vehicles and specifically to providing a system for renting cars via a user's smart phone or other portable electronic device.

2. Background of Related Art

Systems exist that enable users to rent vehicles, make reservations, and pay bills using smart phones and other internet enabled devices. See, e.g., U.S. patent application Ser. No. 11/019,749, filed 21 Dec. 2004, entitled, "Fully Automated Vehicle Rental System"; see, also, Ser. No. 12/773,093, filed 4 May 2010, entitled, "Systems and Methods for Remote Vehicle Rental with Remote Vehicle Access"; both of which are hereby incorporated by reference as if fully set forth below. These services may be provided, for example, by providing a website that can be accessed via the World Wide Web. In this case, the user may be able to access a standard or mobile website, for example, using a browser embedded on their device. In other cases, the user may be able to access a mobile application, or "app," directly from their portable electronic device.

Figure 1:
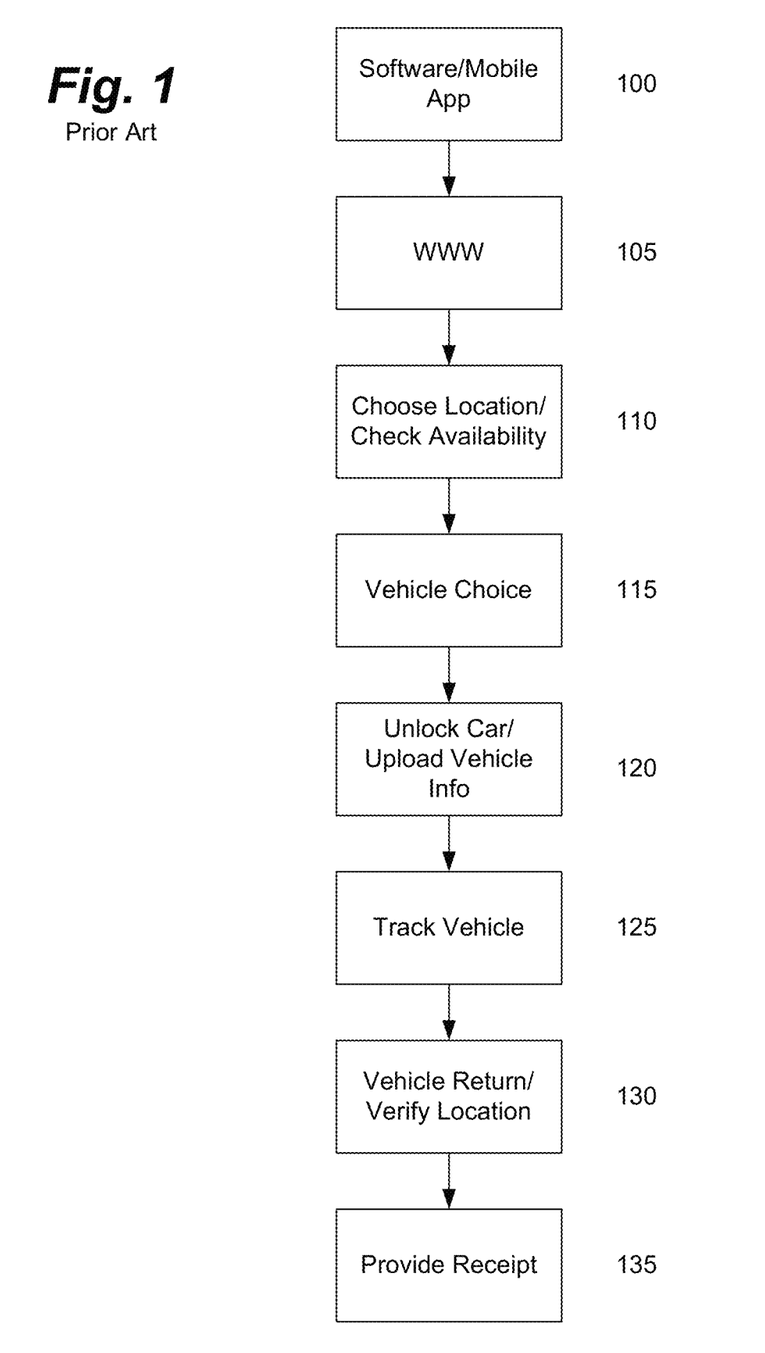
FIG. 1 depicts a flowchart for a conventional online vehicle rental system.

As shown in FIG. 1, a user can access, for example, a website or app 100 to rent a car. The user can use the web site 100 via the World Wide Web 105, for example, to determine a convenient location. After choosing a location 110, the user can then check the availability 110 of rental cars at this location. The user may be able to check the total number of cars available at this location, or, in some cases, may be able to check the types of cars available (i.e., compacts, full size, convertibles, etc.). The user can then choose a particular type of vehicle 115 and/or make a reservation to reserve the car for a predetermined period of time.

After choosing a vehicle and location 115, an automated system can provide the ability to unlock the car and/or to upload certain information about the car 120 (e.g., mileage, fuel level, etc.). In some instances, the system may provide the ability to track the vehicle 125 during use. This can be useful, for example, to verify mileage and to locate abandoned cars, as necessary. Upon return 130, the vehicle's location can be verified and vehicle information can be uploaded again to verify mileage, fuel level, and other information. Upon check-in, the system can provide a receipt 135 and update the vehicle status in the system.

A problem with conventional rental systems, however, even automated ones, is that they require a great deal of infrastructure. The ability to remotely unlock the vehicle, communicate with the vehicle, and communicate with the system, for example, can require built-in cellular or wireless infrastructure. The ability to track the vehicle during use, on the other hand, can require onboard GPS, ground-based radio-frequency ("RF") communications, and/or other means. Pick-up and return lots require internet and/or wireless connections, vehicle tracking, and gated access, among other things. These systems present significant capital investments and pose serious barriers to entry limiting competition and ultimately, increasing costs to consumers.

In addition, using conventional rental systems, the user may still be required to check-in at a rental counter in the chosen location. This may include actually checking-in with a clerk, providing identification, and/or providing a method of payment to check-out the vehicle. In other instances, a computer or kiosk may be provided for the user to scan their credit card, or other means of identification, to check-out the car in a more automatic manner. In either case, any savings provided by the automatic or semi-automatic system is substantially offset by labor costs.

Regardless of the actual procedure used, conventional rental car systems tend to require costly infrastructure. Rental cars are generally located in a central, gated parking lot, for example, to provide controlled access. These parking lots, in turn, must be manned with personnel to check rental agreements, identification, return cars, clean cars, etc. In addition, the cars themselves often have onboard computers, or other rental equipment that can require, for example and not limitation, separate power, one or more means of communication, and GPS or other tracking systems. Systems may also require ground based communications systems to enable the system to track cars, maintain communications, and monitor rental statuses, among other things.

What is needed, therefore, is a vehicle rental system that provides secure access to rental vehicles, tracking, and vehicle monitoring with limited infrastructure investment and maintenance. The system should leverage existing and future web, GPS, and cellular technologies to minimize infrastructure requirements. The system should use existing and future secure, short-range communications technologies to provide secure vehicle access. It is to such systems and methods that embodiments of the present invention are primarily directed.

BRIEF SUMMARY

Embodiments of the present invention relate generally to a system and method for renting vehicles, and specifically to a system for renting cars using existing resources to reduce infrastructure complexity and cost. Embodiments of the present invention can provide improved vehicle security, tracking, and convenience, while reducing investment and increasing flexibility. Embodiments of the present invention can utilize a multi-faceted approach including, but not limited to, using existing cellular, internet, and GPS functionality from users' laptop computers, smart phones, tablets, and other internet or cellular devices ("portable electronic devices").

Embodiments of the present invention can comprise a system for renting vehicles comprising a central control for monitoring the location and status of a plurality of rental vehicles. The system can further comprise a vehicle access communicator ("VAC") for controlling access to a first vehicle of the plurality of vehicles, monitoring one or more vehicle parameters, and interfacing with a portable electronic device to provide the VAC with data services (e.g., cellular, internet, and/or location devices). In some embodiments, the VAC can provide access to the first vehicle upon connecting to a user's portable electronic device.

The portable electronic device can provide the VAC with, for example and not limitation, location services or an internet or cellular connection. The VAC can be in wired or wireless communication with the portable electronic device. In some embodiments, the VAC can be connected to the portable electronic device using a Bluetooth® connection. In other embodiments, the VAC can be connected to the portable electronic device using a USB connection.

The VAC can also be connected to a vehicle's diagnostic port such as, for example and not limitation, the vehicle's OBD-II or can port. This connection can enable the VAC to monitor one or more of the vehicle's odometer, fuel gauge, and ignition status. In some embodiments, the VAC can further comprise one or more stand alone gauges for monitoring one or more vehicle parameters.

Embodiments of the present inventing can also comprise a method for renting vehicles comprising transmitting a vehicle identifier and a password for a first vehicle to a user and providing the user access to the first vehicle upon receiving the password from the user's portable electronic device at the VAC. In some embodiments, the method can further comprise enabling the ignition of the first vehicle upon receiving the password from the user's portable electronic device at the VAC. The method can be implemented, for example and not limitation, using an internet-based application, via an app for the portable electronic device, or using cellular or text messaging services.

As a result, the method can further comprise connecting the VAC to the user's portable electronic device to provide, for example and not limitation, the VAC with internet connectivity and location services. The locations services can be, for example, cellular, GPS, or other types of location services. In some embodiments, the method can further comprise providing one or more designated Green Zones, or designated areas, for one or more of dropping off and picking up rental vehicles. In some embodiments, the Green Zones can be identified, for example, with GPS coordinates.

In some embodiments, the VAC can comprise a processor for monitoring and controlling one or more vehicle inputs, a wireless transceiver for sending and receiving wireless data, and a first vehicle connector for connecting to a diagnostic port on the vehicle. In some embodiments, the wireless transceiver can connect to a user's portable electronic device to provide the VAC with one or more of cellular, internet, and location services.

In some embodiments, the VAC can (1) enable the vehicle when it has been properly accessed and (2) disable the vehicle when it is not in use. In some embodiments, the VAC can disable the vehicle until receiving authorization, when can include, for example and not limitation, receiving authorization from the central control or receiving a correct password from the user via the portable electronic device.

In some embodiments, the system can further comprise a second vehicle connector for connecting to one or more for the first vehicle's relays or fuses to control one or more vehicle systems. In this configuration, the second connector can be connected to the fuel pump relay, for example, and the VAC can de-energize the fuel pump relay to disable the vehicle or energize the fuel pump relay to enable the vehicle. Similarly, the second vehicle connector can connect to the vehicle's starter relay and the VAC can de-energize the starter relay to disable the vehicle or energize the starter relay to enable the vehicle. In still other embodiments, the second vehicle connector can connect to the vehicle's ignition relay and the VAC can de-energize the ignition relay to disable the vehicle or energize the ignition relay to enable the vehicle. In still other embodiments, the second vehicle connector can connect to one or more of the vehicle's fuses and the VAC can electrically disconnect one or more of the vehicle's fuses to disable the vehicle and electrically connect one or more of the vehicle's fuses to enable the vehicle.

In still other embodiments, the VAC can disable the vehicle by deauthorizing all smart keys for the vehicle and enable the vehicle by authorizing one or more smart keys for the vehicle. Similarly, the VAC can disable the vehicle by requiring one or more smart keys and enable the vehicle by authorizing one or more dumb keys (i.e., where no smart key is provided). In still other embodiments, the VAC can disable and enable the vehicle by providing a direct command to the vehicle via the diagnostic port. Similarly, the VAC can disable the vehicle by providing a pulsed disable command to the vehicle via the diagnostic port to disable the vehicle for a predetermined amount of time and enable the vehicle by stopping the pulsed disable command. The system can also use a smart key located in the vehicle, but inaccessible to the user, and a dumb key located in the vehicle. In this configuration, the VAC can disable the vehicle by disconnecting the smart key from the vehicle and enable the vehicle by connecting the smart key to the vehicle.

These and other objects, features and advantages of the present invention will become more apparent upon reading the following specification in conjunction with the accompanying drawing figures.

DETAILED DESCRIPTION

Embodiments of the present invention relate generally to a system and method for renting vehicles, and specifically to a system for renting cars using existing resources to reduce infrastructure complexity and cost. Embodiments of the present invention provide improved vehicle security, tracking, and convenience, while reducing capital investment and increasing flexibility. Embodiments of the present invention can utilize a multi-faceted approach including, but not limited to, using existing cellular and GPS functionality from user's smart phones, laptops, tablets, and other internet or cellular devices. In some embodiments, the system can provide disable/enable features to control use of rental vehicles, for example.

To simplify and clarify explanation, the system is described below as a system for renting cars on a commercial or personal level. One skilled in the art will recognize, however, that the invention is not so limited. For ease of explanation, the term "Bluetoote" is used below, however, one skilled in the art will recognize that existing and future secure wired and wireless connections can be used. The system can also be deployed for other rental applications such as, for example, equipment rental, bicycle rental, or anywhere access control and tracking are desirable. The system can also comprise an energy efficient, vehicle monitoring device, or vehicle access communicator ("VAC") that leverages, or "piggy backs," on existing cellular and/or internet devices.

The materials described hereinafter as making up the various elements of the present invention are intended to be illustrative and not restrictive. Many suitable materials that would perform the same or a similar function as the materials described herein are intended to be embraced within the scope of the invention. Such other materials not described herein can include, but are not limited to, materials that are developed after the time of the development of the invention, for example. Any dimensions listed in the various drawings are for illustrative purposes only and are not intended to be limiting. Other dimensions and proportions are contemplated and intended to be included within the scope of the invention.

As mentioned above, a problem with current rental systems is that they require a great deal of human intervention and/or excessive infrastructure. In conventional manual systems, for example, multiple workers are required to, among other things, check vehicles in and out, move vehicles, and prepare vehicles for rental. In highly automated conventional systems, on the other hand, large infrastructure investments must be made to provide sufficient access control, check vehicles in and out, and to track and locate vehicles during and after use. What is needed, therefore, is a system that utilizes existing technologies, which a majority of users already have, to provide these functionalities at a reduced cost. It is to such a system that embodiments of the present invention are primarily directed.

A vast majority of rental car users, and a majority of the population in general, own and use some type of cellular or web-based, portable electronic device. In the United States, for example, 90% of Americans now own a cell phone, computer, MP3 player, game console, e-book reader or tablet computer, 85% own a cell phone[1], and 46% of adults were smart phone users as of February 2012.[2] These devices often provide cellular and/or wireless based internet connections, cellular and/or GPS based location systems, and short range, secure RF connections (e.g., Bluetooth®). Embodiments of the present invention relate to a vehicle rental system designed to exploit some, or all, of these features to enable reduced infrastructure cost and improved security, among other things.

[1] Amy Gahran, "Report: 90% of Americans own a computerized gadget," CNN.com available at http://articles.cnn.com/2011-02-03/tech/texting.photos.gahran_1_cell-phone-landline-tech-gadget?_s=PM:TECH (citing Pew Internet & American Life Project data).
[2] Aaron Smith, "46% of Americans are Smartphone Owners," Pew Internet & American Life Project (Mar. 1, 2012) available at http://pewinternet.org/Reports/2012/Smartphone-Update-2012.aspx.

Figure 2:
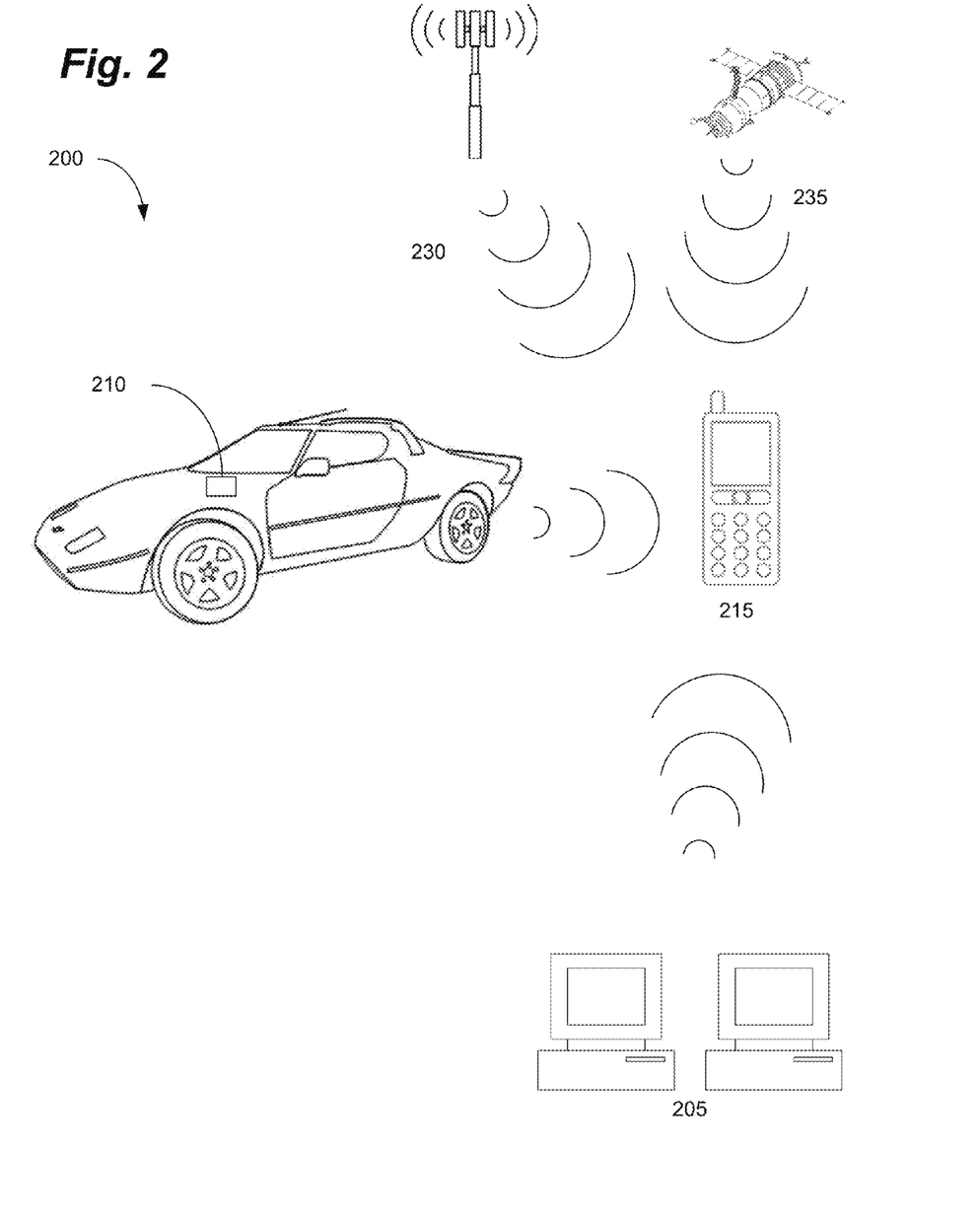
FIG. 2 depicts a vehicle rental system, in accordance with some embodiments of the present invention.

As shown in FIG. 2, therefore, embodiments of the present invention can comprise a system 200 for renting vehicles comprising a central control 205, a vehicle access communicator ("VAC") 210, and a user's portable electronic device 215. In some embodiments, the central control 205 can comprise one or more linked and/or internet connected computers and can maintain, for example and not limitation, vehicle availability, locations, and rental rates. In some embodiments, the central control 205 can provide a web-based user interface to enable users to check availability and rates, reserve and return cars, and maintain their account, among other things. In other embodiments, the central control 205 can provide these functions via a mobile application, or "app," to enable users to access the system 200 via a cellular or wireless internet connection from a portable electronic device 215, for example. In still other embodiments, the central control 205 can provide these functions via text messaging, e-mail, or other internet or cellular services.

Figure 3A:
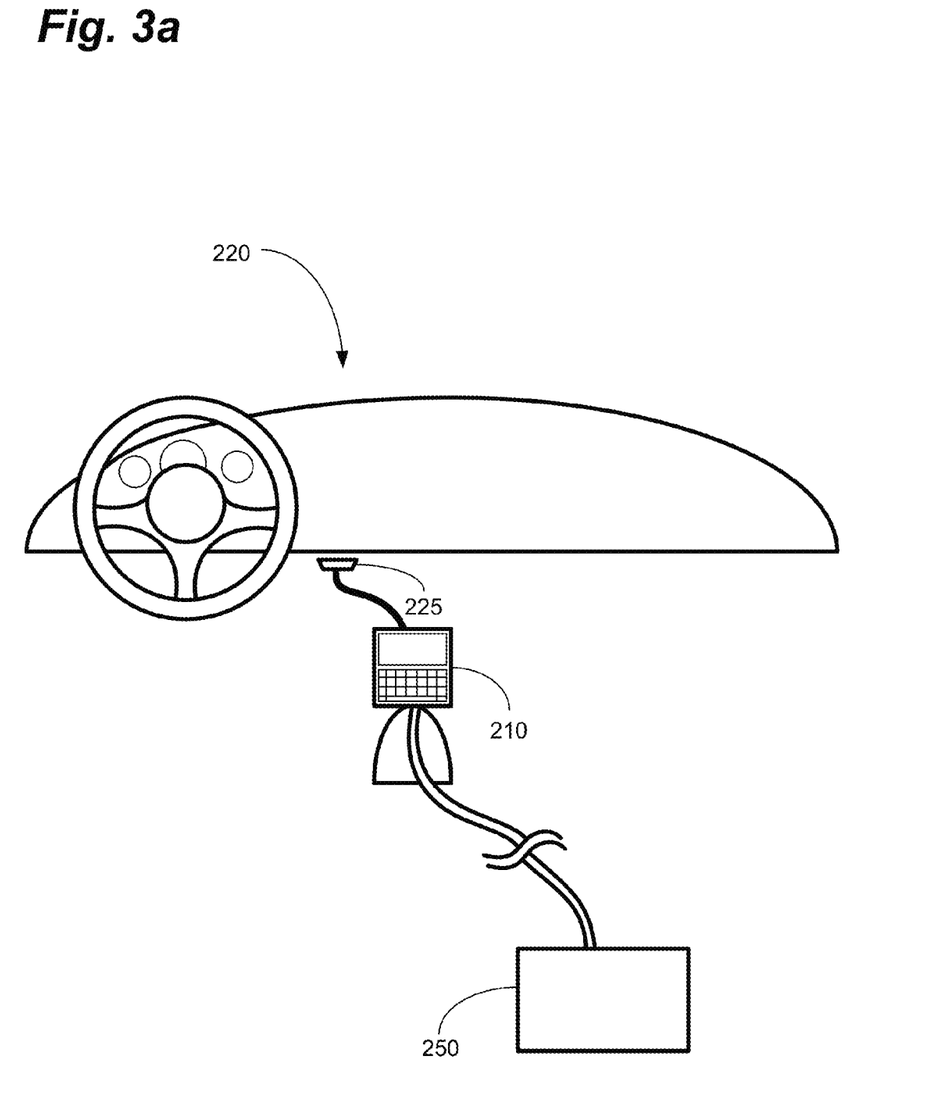
FIG. 3a depicts a vehicle access communicator installed in a vehicle, in accordance with some embodiments of the present invention.

As shown in FIG. 3a, the system 200 can further comprise a VAC 210. The VAC 210 can be detachably mounted to the vehicle 220 in a suitable location. In some embodiments, the VAC 210 can interface with the vehicle 220 to provide vehicle data. The VAC 210 can access vehicle information, for example, via the vehicle's diagnostic port (e.g., OBD-II port) 225. In some embodiments, the VAC 210 can connect wirelessly to the vehicle (e.g., using a wireless dongle) or can connect to the vehicles controller area network ("CAN") or other networks. In other embodiments, the VAC 210 can have stand alone sensors 250 for monitoring various vehicle parameters (e.g., a fuel gauge).

Regardless, the VAC 210 can monitor various vehicle parameters including, but not limited to, fuel level, mileage, average speed, and top speed. Fuel level can be useful, for example, to ensure that the vehicle is returned with a full tank (or the same level of fuel that the vehicle had a check-out). Top speed may be useful, for example, to monitor the vehicle and prevent abuse. The mileage the vehicle traveled may be important, for example, when the cost of the rental is based, in whole or in part, on the distance the vehicle travels during the rental period.

In some embodiments, the VAC 210 can also have a data connection to the user's portable electronic device 215. In some embodiments, this can be a wired connection such as, for example and not limitation, a USB connection or an iPhone® type connection. In other embodiments, the VAC 210 can connect to the user's portable electronic device 215 via a wireless data connection such as, for example, an RF connection. In some embodiments, the connection can be a secure wireless connection using encryption or other means such as, for example, WEP, WPA, or WPA-2. In still other embodiments, the VAC 210 can connect to the user's portable electronic device 215 using a Bluetooth® connection, or other short range, secure protocol.

In some embodiments, the user's portable electronic device 215 can be internet enabled. When the VAC 210 is connected to the user's portable electronic device 215, therefore, cellular and/or internet access can be provided without the need for an internal communication means in the VAC 210. In this manner, the need for a separate RF, wireless, or cellular data communication system can be obviated and the cost of the VAC 210 can be reduced. In other words, because the system 200 utilizes existing communications infrastructure (e.g., cellular towers), no separate infrastructure investment, such as ground based RF communications, is required, though existing systems may nonetheless be utilized.

In other embodiments, the user's portable electronic device 215 can provide location services. In some embodiments, this can be provided using an embedded GPS receiver in the portable electronic device 215. In other embodiments, the portable electronic device 215 can use cellular based triangulation-type system to determine positioning. This can be done by triangulating the radio sources from multiple towers, for example, or simply by comparing signal strengths from several towers. Regardless, as with the communication means discussed above, the use of the embedded location services on the user's portable electronic device 215 obviates the need for such facilities in the VAC 210. This can further reduce the cost of producing the VAC 210 and further reduces overall infrastructure costs.

Figure 3B:
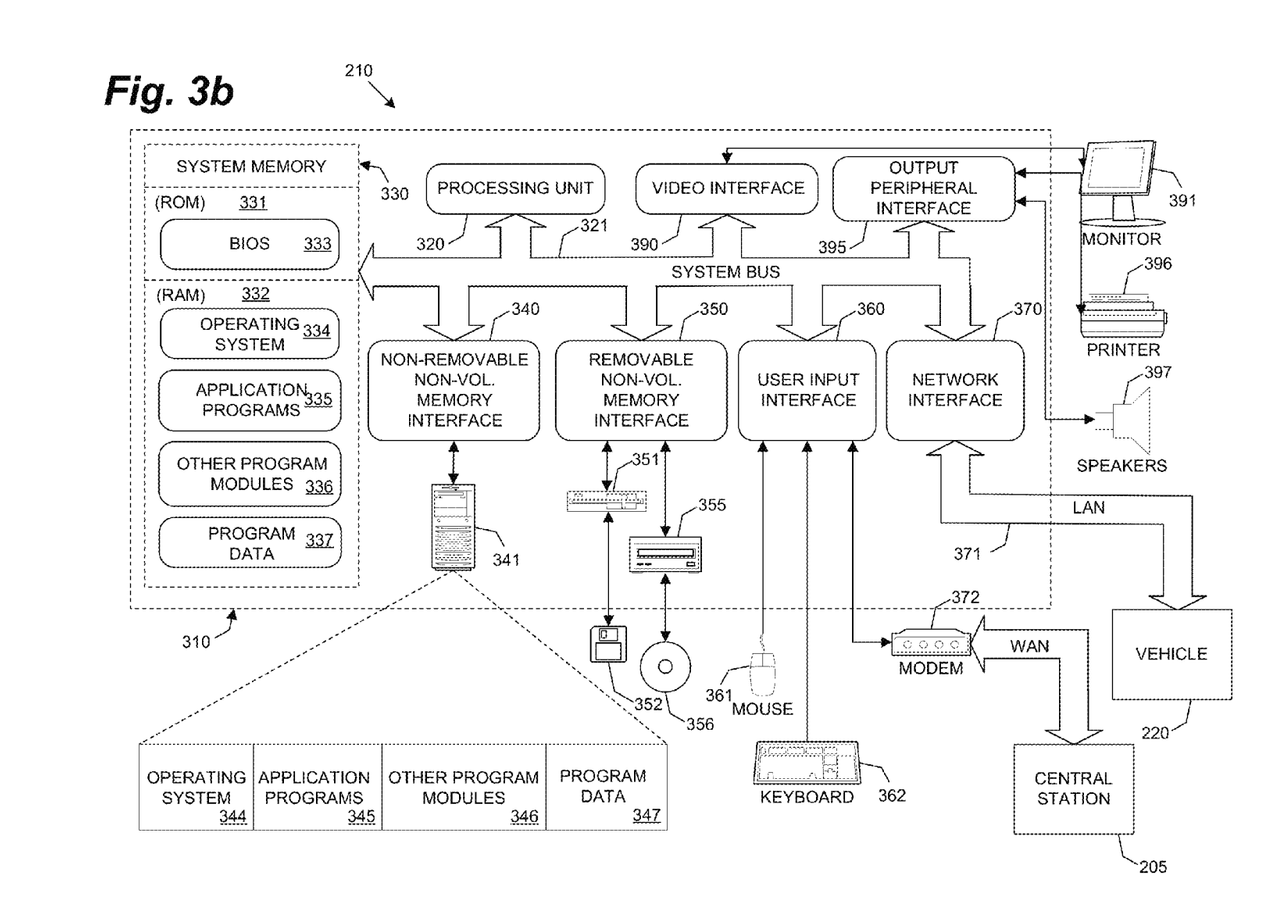
FIG. 3b depicts a schematic of a vehicle access communicator, in accordance with some embodiments of the present invention.

FIG. 3b illustrates one possible architecture of the VAC 210 used for implementation of the system 200, according to an exemplary embodiment of the present invention. As mentioned above, one or more aspects of the system 200 and related methods 400 can be embodied, in whole or in part, in the VAC 210. FIG. 3b illustrates an example of a suitable VAC 210 that can be used.

Although specific components of a VAC 210 are illustrated in FIG. 3b, the depiction of these components in lieu of others does not limit the scope of the invention. Rather, various types of computing devices can be used to implement embodiments of the system 200. Exemplary embodiments of the system 200 can be operational with numerous other general purpose or special purpose computing system environments or configurations.

Exemplary embodiments of the system 200 can be described in a general context of computer-executable instructions, such as one or more applications or program modules, stored on a computer-readable medium and executed by a computer processing unit. Generally, program modules can include routines, programs, objects, components, or data structures that perform particular tasks or implement particular abstract data types.

With reference to FIG. 3b, components of the VAC 210 can comprise, without limitation, a processing unit 320 and a system memory 330. A system bus 321 can couple various system components including the system memory 330 to the processing unit 320.

The VAC 210 can include a variety of computer readable media. Computer-readable media can be any available media that can be accessed by the VAC 210, including volatile and nonvolatile, removable and non-removable media. Computer-readable media can comprise, for example and not limitation, computer storage media and communication media. Computer storage media can include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store data accessible by the VAC 210. Communication media can include, for example and not limitation, wired media such as a wired network or direct-wired connection, and wireless media such as acoustic, RF, infrared and other wireless media. Combinations of any of the above can also be included within the scope of computer readable media.

The system memory 330 can comprise computer storage media in the form of volatile or nonvolatile memory such as read only memory (ROM) 331 and random access memory (RAM) 332. A basic input/output system 333 (BIOS), containing the basic routines that help to transfer information between elements within the VAC 210, such as during start-up, can typically be stored in the ROM 331. The RAM 332 typically contains data and/or program modules that are immediately accessible to and/or presently in operation by the processing unit 320. FIG. 3b illustrates, for example and not limitation, an operating system 334, application programs 335, other program modules 336, and program data 337.

The VAC 210 can also include other removable or non-removable, volatile or nonvolatile computer storage media. By way of example only, FIG. 3b illustrates a hard disk drive 341 that can read from or write to non-removable, nonvolatile magnetic media, a magnetic disk drive 351 for reading or writing to a nonvolatile magnetic disk 352, and an optical disk drive 355 for reading or writing to a nonvolatile optical disk 356, such as a CD ROM or other optical media. Other computer storage media that can be used in the exemplary operating environment can include magnetic tape cassettes, flash memory cards, digital versatile disks, digital video tape, solid state RAM, solid state ROM, and the like. The hard disk drive 341 can be connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 3b can provide storage of computer readable instructions, data structures, program modules, and other data for the VAC 210. A hard disk drive 341, for example, is illustrated as storing an operating system 344, application programs 345, other program modules 346, and program data 347. These components can be the same as, or different than, the operating system 334, application programs 335, other program modules 336, and program data 337.

A web browser application program 335, or web client, can be stored on the hard disk drive 341 or other storage media. The web client 335 can request and render web pages, such as those written in Hypertext Markup Language, in another markup language, or in a scripting language. This can enable the VAC 210, via the user's portable electronic device 215 or other means, to access web-based applications, for example, as necessary.

A user can enter commands and information such as, for example and not limitation, driver's license, credit card, and rental information. The information can be entered into the VAC 210 using input devices such as a keyboard 362 and/or pointing device 361, commonly referred to as a mouse, trackball, or touch pad. Other input devices (not shown) can include a microphone, joystick, game pad, satellite dish, scanner, electronic white board, or the like. These and other input devices can be connected to the processing unit 320 through a user input interface 360 coupled to the system bus 321, or can be connected by other interface and bus structures, such as a parallel port, game port, or a universal serial bus. A monitor 391 or other type of display device can also be connected to the system bus 321 via an interface, such as a video interface 390. In addition to the monitor, the VAC 210 can also include other peripheral output devices such as speakers 397 and a printer 396, for example, for printing receipts. These can be connected through an output peripheral interface 395.

The VAC 210 can operate in a networked environment, and be in communication with one or more remote computers over a network. As mentioned above, the VAC 210 can be in communication with the vehicle 220, via, for example, a controller area network (CAN), OBD-II connection, or other suitable means. The VAC 210 can also be in communication with the central station 205 via the user's portable electronic device 215, or other suitable wireless or wired means. The central station 205 can be a personal computer, a server, a router, a network PC, a peer device, or other common network node, and can include many or all of the elements described above relative to the VAC 210.

When used in a LAN networking environment (e.g., when connected to the vehicle 220), the VAC 210 can be connected to the LAN 371 through a network interface or adapter 370. When used in a WAN networking environment (e.g., when connected to the central station via the user's portable electronic device 215) the VAC 210 can include a modem 372 or other means for establishing communications over the WAN 373. The modem 372, which can be internal or external, can be connected to the system bus 321 via the user input interface 360 or other appropriate mechanism. In a networked environment, program modules depicted relative to the VAC 210 can be stored in the remote memory storage device. FIG. 3b illustrates possible remote application programs 385 as residing on memory storage device 381. It will be appreciated that the network connections shown are exemplary and other means of establishing a communications link between the VAC 210 and the car 220 and the VAC 210 and the internet and central station 205 can be used.

Thus, the VAC 210 can comprise multiple configurations and components, including onboard computing, GPS, and other capabilities. In a preferred embodiment, however, the VAC 210 can have minimal on-board capabilities by leveraging internet, user interface, GPS, and cellular capabilities, among other things, from the user's portable electronic device 215. In some embodiments, therefore, the VAC 210 can use only a connection the vehicle (e.g., OBD-II) and a connection to the portable electronic device (e.g., Bluetooth). In other words, the remainder of the functions can be provided by the user's portable electronic device. This can obviate the need for, for example and not limitation, internal GPS, internet or cellular connections, and the need for a screen or data entry device (e.g., keyboard), among other things. This, in turn, can significantly reduce the complexity, cost, and weight of the VAC 210 and minimize installation costs.

Figure 4:
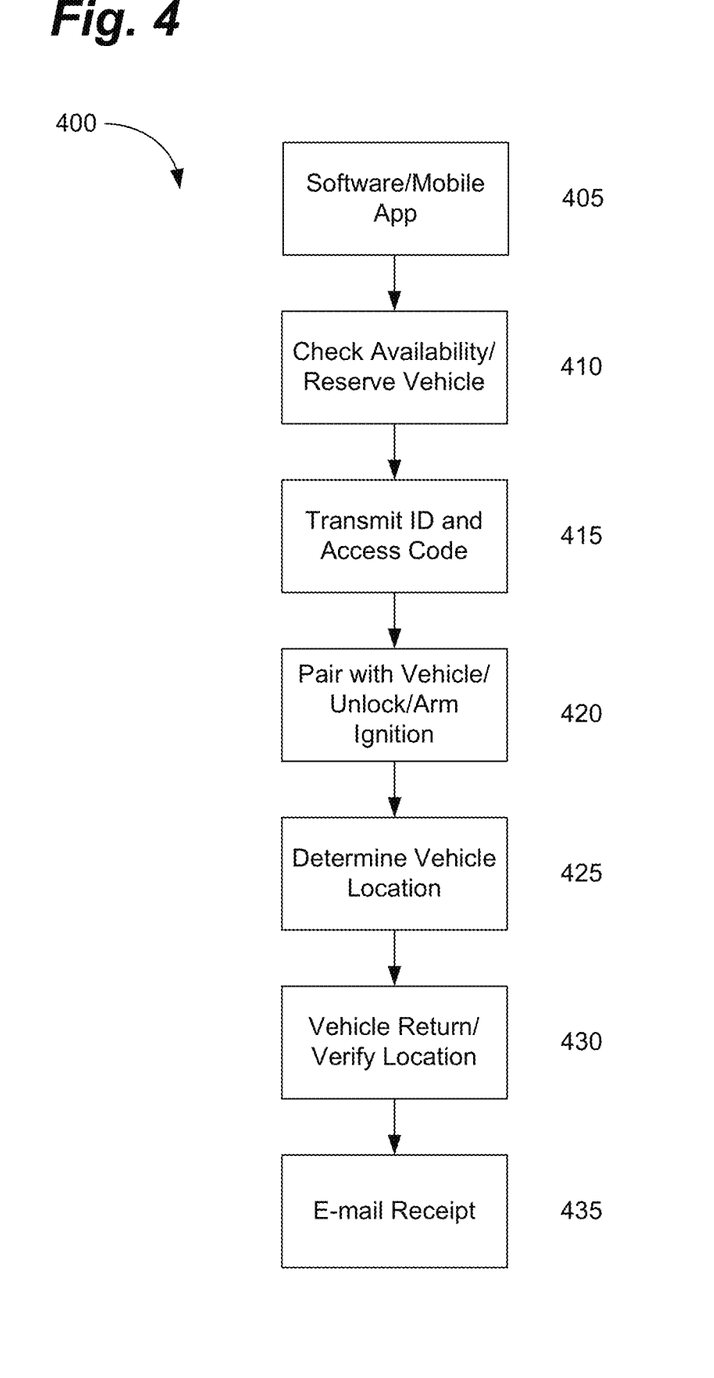
FIG. 4 depicts a flow chart for renting a vehicle, in accordance with some embodiments of the present invention.

As shown in FIG. 4, to rent a vehicle, the user can access a website or app 405 in communication with, or provided by, the central control using, for example, a cellular or internet connected device. The website or app can provide location and vehicle availability, rates, and other information to enable the user to choose a location and a vehicle 410. Once the user has chosen the desired location and/or vehicle, the user can be provided with a confirmation, which can include, for example, a unique vehicle identifier ("VID") and a password 415. In some embodiments, the password 415 can be, for example and not limitation, a Bluetooth® pairing code.

Upon arrival at the vehicle, the user's portable electronic device can be placed in discover mode to enable the user to view the available Bluetooth® devices in the immediate area. Obviously, in a rental lot, a large number of vehicles with VACs may be present; however, since the user was provided the correct vehicle identification on the confirmation, they need only locate the correct VID on their portable electronic device 215. In other embodiments, the VACs may not be in "discover" mode and the user can simply enter the VID and password manually. In this manner, the user does not have to locate the correct VID among tens or hundreds of VIDs on the screen. After locating the correct vehicle (i.e., VID) or entering the VID manually, the user can simply enter the Bluetooth® pairing code (or other suitable password), also provided on the confirmation. This can connect 420 the user's portable electronic device to the VAC in the vehicle.

In some embodiments, upon receiving the correct pairing code, the VAC can perform one or more tasks 420. In some embodiments, for example, upon receipt of the correct pairing code, the VAC can unlock the doors 420 of the rental vehicle. This can enable the keys for the vehicle, for example, to be left in the vehicle when not in use. In other embodiments, such as in cars with keyless ignition systems, the VAC can also arm the ignition 420 enabling the user to start the car with a starter button, for example.

In some embodiments, the VAC can connect with the central control using the user's portable electronic device prior to unlocking or enabling the car. In this manner, the vehicle cannot be opened or started unless the vehicle has been properly rented by the user. In this manner, the vehicle cannot be stolen even if the pairing code has been intercepted or otherwise "hacked."

Referring back to FIG. 2, in some embodiments, the system 200 can further comprise an app installed on the user's portable electronic device 215. The app can enable the system 200 to access various features on the user's portable electronic device 215, as discussed above. Upon pairing with the user's portable electronic device 215, for example, the VAC 210 can also utilize the cellular or wireless data and communications connections 230 on the portable electronic device 215. This can enable the VAC 210 to connect directly with the central station 205, for example, to verify the status of the vehicle and/or user, or can enable the VAC 210 to access the internet to utilize, for example, a web based control application.

In some embodiments, the app can further enable the VAC 210 to access the location features 235 of the portable electronic device 215. As mentioned above, these features can be, for example and not limitation, cellular or GPS based locations systems or other location systems. The VAC 210 can use this information, for example, to calculate the distance traveled (e.g., to confirm or replace a direct odometer reading from the vehicle), to confirm the vehicle has been dropped off in a designated location (or "Green Zone," as discussed below), and/or to provide vehicle locations during use. This can be useful, for example, to ensure that a vehicle is not taken out of state in violation of the rental agreement or to locate the vehicle during a break-down. In some embodiments, the portable electronic device's 215 location 235 and/or internet 230 services can be used only at pick-up and drop-off to limit battery and data usage and/or for the privacy of the user. In other embodiments, the app can provide the location information to the central control directly, using the location services 235 of the user's portable electronic device 215. This eliminates the needs for the VAC 210 to access the location features 235. In some embodiments, therefore, location-based decisions can be made directly between the user's portable electronic device 215 and the central control.

The use of the embedded technologies in the portable electronic device 215 by the VAC 210 (and by the system 200 overall) not only reduces infrastructure cost and complexity, but also enables the VAC 210 to be easily installed and removed from vehicles. In other words, because the VAC 210 can utilize resources from other devices, the connections for the VAC 210 are simplified. Because the VAC 210 utilizes location 235 and/or communication 230 services from the user's portable electronic device 215, for example, no cellular radio or GPS connections or antennas are required on the vehicle. Similarly, in some embodiments, because the VAC 210 can be connected to the diagnostic port 225 of the vehicle, an external power source for the VAC 210 may be obviated.

As a result, installation of the VAC 210 can be achieved, for example, simply by choosing a suitable location in the vehicle and plugging a cord into the diagnostic port 225 of the vehicle. As shown in FIG. 3, in some embodiments, the VAC 210 can be mounted on the vehicle's transmission tunnel, or "hump," for example, using Velcro®, or other suitable, attachment means. In other embodiments, the VAC 210 can be mounted to the windshield or dash, for example, with a GPS-style suction cup or bean bag mount. The ability to easily install and remove the VAC 210 can be particularly useful in the car rental industry, for example, where cars tend to be replaced on a regular basis.

In some embodiments, location services 235 from the portable electronic device 215 can also be used to provide temporary or permanent "Green Zones." Green Zones can be areas that are authorized for rental vehicle pick-up and/or drop off. Thus, as long as the vehicles location can be verified during the pick-up and drop-off process, the vehicle can be picked-up or dropped off in any designated Green Zone. In a preferred embodiment, to facilitate this feature the user can be required to establish a valid location fix (e.g., by GPS or cellular location services) and/or an internet connection (e.g., via wireless or cellular means) at least at the time the car is pick-up and the time the car is dropped-off.

Green Zones can be permanently or temporarily designated areas. The conventional airport rental lot, for example, can be designated a permanent Green Zone, though no specific infrastructure (e.g., fencing, gates, internet connections, etc.) are required. All that is required, for example, are the GPS coordinates that define the bounds of the desired lot or parking area. In other embodiments, part, or all, of a college campus, for example, could be designated a Green Zone to enable a rental service for students to run errands. The student can simply use her portable electronic device 215 to locate a rental vehicle on campus and check the vehicle out. When finished, because the VAC 210 can verify the vehicle's location (i.e., using the user's portable electronic device 215), the vehicle can be checked-in anywhere on campus.

To provide cars for a large convention, golf tournament, or other events, on the other hand, a temporary Green Zone can be designated in a particular parking lot or on one or more designated streets, for example. The temporary Green Zones can be area and time limited to prevent cars being dropped off after the event has concluded. In this manner, attendees can pick up and return a car for use during the event at the convention center, for example. Of course, in some embodiments, the user can also pick up the car at a first Green Zone (e.g., the convention center) and return it to a second Green Zone (e.g., at the airport), or any combination thereof, if this is more efficient and/or convenient.

Due to the accuracy of current GPS and/or cellular location services 235, the use of Green Zones can also enable individuals to make personal cars available for rent. In other words, a user can simply designate, for example and not limitation, his driveway or street as a Green Zone. The user can then advertise his vehicle for rent in an appropriate manner, e.g., online, through, for example, a cooperative website or Craig's List. Thereafter, as long as the user picks up and drops off the vehicle in the correct driveway or on the correct street, for example, the system 200 can check the vehicle in and out.

In some embodiments, the system 200 can also comprise a back-up location system. In the event the car is abandoned or stolen, for example, the VAC 210 can further comprise, for example and not limitation, a battery powered GPS, RF, or cellular back-up location system to enable the vehicle to be located. In some embodiments, these systems can be back-up only and provide only the minimum required location and/or communications services (e.g., location within several blocks), for example, to minimize cost. In some embodiments, the VAC 210 can include a back-up transceiver to provide RF communications. In some embodiments, the vehicle can simply be equipped with an existing location system, such a LoJack®, for this purpose.

Conventional rental systems typically provide only access control with no vehicle disabling. As a result, if one breaks into the car by, for example, breaking a window or "slim-jimming" the door, the vehicle can easily be stolen using the key in the car. If the car is internally disabled, on the other hand, a full featured key for the vehicle can be left in the vehicle without fear that the car will be stolen. In other words, even with the key, the vehicle cannot be started. This not only reduces or prevents vehicle theft, but also enables users to utilize many convenient features provided by modern keys such as, for example and not limitation, keyless door and truck entry, panic buttons, and light control. In some embodiments, the VAC 210 can access the central control using the portable electronic device 215 to confirm that the vehicle has been rented and/or verify the user. This can prevent unauthorized use by someone who has, for example, "hacked" the connection to the VAC 210.

Figure 5:
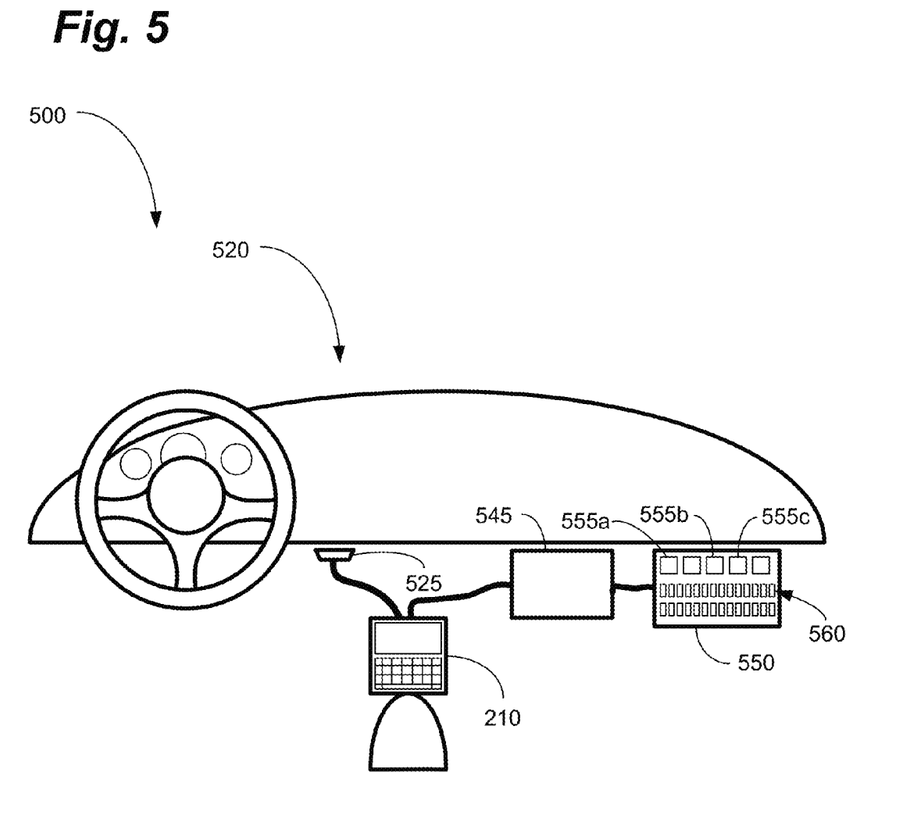
FIG. 5 depicts a vehicle access communicator with a first vehicle connector and a second vehicle connector installed in a vehicle, in accordance with some embodiments of the present invention.

In still other embodiments, therefore, the VAC 210 can provide vehicle immobilization services. This can enable a rental vehicle 520 to be disabled using, for example and not limitation, the vehicle's ignition, starting, or fuel systems. In some embodiments, immobilization services can be provided through the vehicle's existing diagnostic port (e.g., OBD-II port) 525. In this configuration, no additional installation time or cost is required for the system because the VAC 210 may already be plugged into the OBD-II port 525 to provide rental services. In other embodiments, immobilization services can be hard wired into the vehicle's existing systems. This may be necessary in cars with limited computer access via the OBD-II port 525, or due to other factors (e.g., cars with computer encryption).

In vehicles with computers 545 that accept direct "disable" commands via OBD-II 525, for example, the VAC 210 can simply send a disable command to the vehicle's computer 545 when the vehicle 520 is not in use. When the vehicle 520 has been reserved and/or properly accessed (i.e., the user has accessed the vehicle 520 with their portable electronic device 215, on the other hand, the VAC 210 can enable the vehicle. In use, when the user connects with the vehicle 520 via Bluetooth®, or other suitable means, for example, the VAC 210 can unlock the doors and enable the vehicle 520 (e.g., via the ignition system, fuel system, and/or starter). Due to the short range nature of the system (e.g., using Bluetooth®) the vehicle can also be left disabled until the user is in close proximity, further improving security.

The VAC 210 can disable the vehicle 520 in a number of ways. As mentioned above, in some vehicles, for example, the vehicle's on-board computer 545 can accept a direct command via, for example, the OBD-II port 525 to disable the vehicle. In this configuration, no additional time or expense is required when installing the VAC 210 as the command is simply sent via the OBD-II port 525 already in use. Other vehicles, such as GM vehicles, may use security encryption or other security means. In these configurations, therefore, the VAC 210 can learn the vehicle's existing security protocols (e.g., rolling, or other, security codes) in order to provide commands directly to the vehicle's computer 545. This can be achieved, for example, with a learning routine similar to those used for garage door openers. Fortunately, in most cases this can be accomplished during installation and, once completed, need not be repeated for that vehicle.

Some vehicles use "smart keys" for access. Smart keys can contain small integrated circuits, RFID chips, or other means for pairing with the vehicle and providing additional security. In this manner, the ignition switch cannot be defeated, for example, simply by breaking it and inserting a screwdriver. This technology can also be used advantageously, however, to provide access control for the system 500.

In some embodiments, therefore, the system 500 can enable and disable smart keys in the vehicle's computer 545 to enable the key to be left in the vehicle 520, but prevent unauthorized use of the vehicle 520. In other words, when the vehicle 520 is available (i.e., has not been rented), the system 500 can disable all of the smart keys. In this manner, the vehicle 520 is effectively deactivated because no keys will start the car. When the vehicle 520 is rented, on the other hand, and/or the user has approached and paired with the vehicle 520, the system 500 can unlock the car 520 and/or authorize the one or more keys located in the car 520. When the rental is complete, and the user checks the vehicle 520 back in, the system 500 can once again deauthorize all keys disabling the vehicle 520.

In other embodiments, the vehicle' computer 545 may have provisions to disable the vehicle 520 for a pre-determined period of time. The vehicle 520 may include this ability, for example and not limitation, as part of the factory security system or in response to an accident. This feature may only disable the vehicle 520 temporarily, however, and then reset after a pre-determined amount of time. In this case, the VAC 210 can repeatedly send a disable command at the necessary interval until the vehicle 520 is rented and/or accessed. When the vehicle is rented and/or accessed, the VAC 210 can stop sending the disable command which, at the end of the pre-determined time, effectively enables the vehicle 520. In some embodiments, the system 500 can provide a message to the user stating "Your vehicle 520 will be ready for rental in approximately [the pre-determined time] minutes/seconds."

In still other embodiments, the system 500 can use the vehicle's smart key features to disable the vehicle. In other words, the vehicle can be provided for rental with a simple metal, "dumb" key, i.e., a key that does not contain a chip or other electronics. When the vehicle is available (i.e., not rented), therefore, the VAC 210 can send a command to the vehicle's computer to require smart keys. Thus, in this mode, the metal key will not start the vehicle and the smart key is not provided. When the vehicle had been rented and/or accessed, on the other hand, the VAC 210 can send a command to disable the use of smart keys. In this mode, the plain metal key is able to start the vehicle. This also enables inexpensive metal keys to be used reducing replacement costs.[3]

[3] Many vehicle smart keys and/or keys with remote features cost in excess of $200.

In yet other embodiments, the rental vehicle can be fitted with both a smart key, that is not accessible to the user, and a dumb key. In this configuration the smart key can be placed in a location, or shielded, such that it does not connect with the vehicle and is not accessible to the user. The smart key can then be fitted with an antenna or direct wired to the ignition, such that, when activated, the smart key connects with the vehicle to activate it. The antenna or wire can be controlled by the VAC 210 using a simple switch or relay. Thus, the dumb key can be placed in the vehicle's ignition or otherwise tethered to the vehicle, but cannot start the vehicle until the VAC 210 connects the smart key to the vehicle.

In vehicles that do not have a disabling function, or disabling systems that cannot be easily accessed, the VAC 210 can disable the vehicle using other methods. In some embodiments, the vehicle's fuel 555a, ignition 555b, or starter relay 555c, for example and not limitation, can be replaced with a relay that is connected to, and controlled by, the VAC 210. In this manner, the vehicle 520 can be disabled by the VAC 210 until properly accessed by the user. In some embodiments, this functionality can be provided by a wireless relay in the vehicle and a transmitter located in the VAC 210. This can enable the system 500 to be installed with minimal additional work. In other words, the stock relays 555 can simply be removed and replaced with wireless relays. In other embodiments, the relays 555 can be directly wired to the VAC 210. In still other embodiments, the system 500 can use a wireless or wired fuse or fusible link 560 to interrupt power to, for example and not limitation, the vehicle's fuel pump, ignition, or computer. In some embodiments, the vehicles relay and/or fuse panels 550 can be secured with locking covers, or other means, to prevent theft.

Many vehicles provide a shifter lock-out solenoid to prevent the vehicle from inadvertently being taken out of gear (e.g., "Park" on automatic transmissions). In some embodiments, therefore, the system 500 can utilize the vehicle's shifter lock-out system to disable the vehicle 520. In other words, the system 500 can leave the shifter solenoid or mechanism engaged, such that the vehicle 520 will not come out of Park, unless the user has properly reserved and accessed the vehicle 520. Similarly, the vehicle's steering wheel lock, which is often controlled by a solenoid, can also be left engaged, disabling the vehicle's steering. Similarly, in vehicles with electronic parking brakes, the parking brake can be left engaged so that even if the vehicle 520 can be started, it will not move. As above, these features can be controlled via wired or wireless communication.

In addition, many vehicles utilize electronic, or electronically shifted, transmissions. In other words, when the user moves the shift lever in the vehicle 520, it is not directly connected to the vehicle's transmission, but rather is a positional switch. When the user selects "Drive," therefore, the shifter commands a solenoid, either directly or through the vehicle's computer 545, to shift the vehicle's transmission into Drive. In some embodiments, therefore, the system 500 can prevent the transmission from shifting out of Park unless and until the vehicle 520 has been properly rented and accessed.

The ability of the VAC 210 to disable the vehicle provides numerous advantages. The most obvious advantage is, of course, reducing the number of rental vehicles that are stolen during periods of non-use. In other words, because the vehicle is disabled until the vehicle is both rented and locally accessed, the vehicle is extremely difficult to steal. In addition, disabling the vehicle enables a full-functioned key to be left in the vehicle, increasing convenience for the user. Disabling the vehicle can also be used when, for example, the user leaves an authorized area (e.g., crosses a state line) or uses the vehicle in an unsafe manner (e.g., their speed or acceleration exceeds a predetermined threshold).

While several possible embodiments are disclosed above, embodiments of the present invention are not so limited. For instance, while several possible connection schemes and components have been disclosed (e.g., Bluetooth®), other suitable communication methods, components, materials, and layouts could be selected without departing from the spirit of the invention. In addition, the location and configuration used for various features of embodiments of the present invention can be varied according to a particular application or vehicle need that requires a slight variation due to, for example, the materials used and/or space or power constraints. Such changes are intended to be embraced within the scope of the invention.

The specific configurations, choice of materials, and the size and shape of various elements can be varied according to particular design specifications or constraints requiring a device, system, or method constructed according to the principles of the invention. Such changes are intended to be embraced within the scope of the invention. The presently disclosed embodiments, therefore, are considered in all respects to be illustrative and not restrictive. The scope of the invention is indicated by the appended claims, rather than the foregoing description, and all changes that come within the meaning and range of equivalents thereof are intended to be embraced therein.

We claim:

1. A method for providing access to a vehicle comprising:
receiving, by a portable electronic device, a user inputted request for a listing of available vehicles;
connecting, by the portable electronic device and via an internet connection, to a central control;
searching, by the portable electronic device, for the listing of available vehicles;
receiving, by the portable electronic device, an indication of a user selection of a desired available vehicle from the listing of available vehicles;
transmitting, by the portable electronic device, via a short-range wireless connection with a vehicle access communicator that is incapable of directly communicating with the central control, a request for vehicle access;
receiving, by the portable electronic device, via the short-range wireless connection with the vehicle access communicator, a first message for the central control, the first message representing a request to verify that the user is authorized to access the vehicle;
relaying, by the portable electronic device, via the internet connection with the central control, the first message to the central control;
receiving, by the portable electronic device, via the internet connection with the central control, a second message for the vehicle access communicator, the second message representing a verification from the central control that the user is authorized to access the vehicle; and
relaying, by the portable electronic device, via the short-range wireless connection with the vehicle access communicator, the second message to the vehicle access communicator, wherein the second message includes a command to the control system of the vehicle to energize an ignition relay of the vehicle.

2. The method of claim 1, wherein the short-range wireless connection is a Bluetooth® connection.

3. The method of claim 1, wherein the request for vehicle access includes information that identifies the user of the portable electronic device.

4. The method of claim 1, wherein the first message includes information that identifies the user of the portable electronic device.

5. The method of claim 1, wherein the second message includes authorization to enable the vehicle.

6. The method of claim 1, wherein a control system of the vehicle unlocks a door of the vehicle in response to the second message.

7. The method of claim 1, wherein a control system of the vehicle energizes a fuel pump relay of the vehicle in response to the second message.

8. The method of claim 1, wherein the request from the user for the listing of available vehicles includes information related to the location of the portable electronic device.

9. The method of claim 1, further comprising:
displaying, by the portable electronic device, the listing of available vehicles to the user.

10. The method of claim 9, further comprising:
receiving, by the portable electronic device, via a user interface, a request from a user for access to a vehicle from the listing of available vehicles.

11. A non-transitory computer-readable storage medium containing program code that enables providing access to a vehicle, the medium comprising:
program code for receiving, by a portable electronic device, a user inputted request for a listing of available vehicles;
program code for connecting, by the portable electronic device and via an internet connection, to a central control;
program code for searching, by the portable electronic device, for the listing of available vehicles;
program code for transmitting, by the portable electronic device, via a short-range wireless connection with a vehicle access communicator that is incapable of directly communicating with the central control, a request for vehicle access;
program code for receiving, by the portable electronic device, via the short-range wireless connection with the vehicle access communicator, a first message for the central control, the first message representing a request to verify that the user is authorized to access the vehicle;
program code for relaying, by the portable electronic device, via the internet connection with the central control, the first message to the central control;
program code for receiving, by the portable electronic device, via the internet connection with the central control, a second message for the vehicle access communicator, the second message representing a verification from the central control that the user is authorized to access the vehicle; and
program code for relaying, by the portable electronic device, via the short-range wireless connection with the vehicle access communicator, the second message to the vehicle access communicator, wherein the second message includes a command to the control system of the vehicle to energize a starter relay of the vehicle.

12. The non-transitory computer-readable storage medium of claim 11, further comprising:
program code for transmitting, by the portable electronic device, via the internet connection with the central control, the request from the user for the listing of available vehicles.

13. The non-transitory computer-readable storage medium of claim 12, further comprising:
program code for receiving, by the portable electronic device, via the internet connection with the central control, the listing of available vehicles.

14. The non-transitory computer-readable storage medium of claim 13, further comprising:
program code for displaying, by the portable electronic device, the listing of available vehicles to the user.

* * * * *